US012335688B2

(12) United States Patent
Schepker et al.

(10) Patent No.: US 12,335,688 B2
(45) Date of Patent: Jun. 17, 2025

(54) ARTIFACT DETECTION AND LOGGING FOR TUNING OF FEEDBACK CANCELLER

(71) Applicant: Starkey Laboratories, Inc., Eden Prairie, MN (US)

(72) Inventors: Henning Schepker, Oldenburg (DE); Sina Miran, St Louis Park, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 239 days.

(21) Appl. No.: 17/938,442

(22) Filed: Oct. 6, 2022

(65) Prior Publication Data

US 2023/0116563 A1 Apr. 13, 2023

Related U.S. Application Data

(60) Provisional application No. 63/262,216, filed on Oct. 7, 2021.

(51) Int. Cl.
*H04R 25/00* (2006.01)

(52) U.S. Cl.
CPC ......... *H04R 25/453* (2013.01); *H04R 25/505* (2013.01); *H04R 25/554* (2013.01); (Continued)

(58) Field of Classification Search
CPC .. H04R 25/453; H04R 25/505; H04R 25/554; H04R 25/558
See application file for complete search history.

(56) References Cited

U.S. PATENT DOCUMENTS

| | | | |
|---|---|---|---|
| 7,738,667 | B2 | 6/2010 | Bramsløw et al. |
| 7,986,790 | B2 | 7/2011 | Zhang et al. |

(Continued)

FOREIGN PATENT DOCUMENTS

| | | | |
|---|---|---|---|
| EP | 2339870 | A2 | 6/2011 |
| EP | 2339870 | A3 | 1/2013 |

(Continued)

OTHER PUBLICATIONS

"European Application Serial No. 22199837.0, Extended European Search Report mailed Mar. 7, 2022", 7 pgs.

*Primary Examiner* — Rasha S Al Aubaidi
(74) *Attorney, Agent, or Firm* — Schwegman Lundberg & Woessner, P.A.

(57) ABSTRACT

Disclosed herein, among other things, are systems and methods for artifact detection and tuning of a feedback canceller. A method includes detecting an artifact of a feedback canceller during operation of a hearing device. Artifact data associated with the detected artifact is stored in a memory of the hearing device, the artifact data including information related to the detected artifact and information related to the hearing device during occurrence of the detected artifact. Artifact statistics are computed based on the stored artifact data, and the artifact data and the artifact statistics are transmitted to an external device. Comparison data is received from the external device, including results of a comparison of artifact data or artifact statistics of the hearing device to artifact data or artifact statistics of other devices. Parameters of the hearing device are automatically adjusted based on the comparison data to improve performance of the feedback canceller.

20 Claims, 4 Drawing Sheets

(52) U.S. Cl.
CPC ....... *H04R 25/558* (2013.01); *H04R 2225/39* (2013.01); *H04R 2225/55* (2013.01)

(56) References Cited

U.S. PATENT DOCUMENTS

| | | | | |
|---|---|---|---|---|
| 8,942,398 | B2 | 1/2015 | Salvetti et al. | |
| 10,206,048 | B2 | 2/2019 | Petersen et al. | |
| 2003/0083565 | A1* | 5/2003 | Toth | G06T 11/005 600/407 |
| 2008/0107296 | A1 | 5/2008 | Bachler et al. | |
| 2017/0156009 | A9 | 6/2017 | Natarajan | |
| 2017/0311095 | A1 | 10/2017 | Fitz et al. | |
| 2022/0286553 | A1* | 9/2022 | Anderson | A61B 5/7405 |
| 2023/0044509 | A1 | 2/2023 | Guo et al. | |
| 2024/0147169 | A1* | 5/2024 | Wiinberg | H04R 25/453 |

FOREIGN PATENT DOCUMENTS

| | | | |
|---|---|---|---|
| EP | 4132009 | A2 | 2/2023 |
| WO | WO-2009068028 | A1 | 6/2009 |

* cited by examiner

ARTIFACT DETECTION AND LOGGING FOR TUNING OF FEEDBACK CANCELLER

CROSS-REFERENCE TO RELATED APPLICATION

This patent application claims the benefit of U.S. Provisional Patent Application No. 63/262,216, filed Oct. 7, 2021, which is incorporated by reference herein in its entirety.

TECHNICAL FIELD

This document relates generally to hearing device systems and more particularly to artifact detection and logging of population data for tuning of an individualized feedback canceller for hearing device applications.

BACKGROUND

Examples of hearing devices, also referred to herein as hearing assistance devices or hearing instruments, include both prescriptive devices and non-prescriptive devices. Specific examples of hearing devices include, but are not limited to, hearing aids, headphones, assisted listening devices, and earbuds.

Hearing aids are used to assist patients suffering hearing loss by transmitting amplified sounds to ear canals. In one example, a hearing aid is worn in and/or around a patient's ear. Hearing aids may include processors and electronics that improve the listening experience for a specific wearer or in a specific acoustic environment.

Hearing aids may include a feedback canceller (FBC) used to suppress acoustic feedback within the device. The feedback canceller may experience artifacts, or periods of instability, such as chirping, howling, whistling, or entrainment during operation. Improved methods of artifact detection and tuning of a feedback canceller are needed which rely on data of individual users as well as that of a hearing device user population.

SUMMARY

Disclosed herein, among other things, are systems and methods for artifact detection and logging for tuning of a feedback canceller for hearing device applications. A method includes detecting an artifact of a feedback canceller during operation of a hearing device. Artifact data associated with the detected artifact is stored in a memory of the hearing device, the artifact data including information related to the detected artifact and information related to the hearing device during occurrence of the detected artifact. Artifact statistics are computed based on at least some of the stored artifact data, and one or more of the artifact data and the artifact statistics are transmitted to an external device. Comparison data is received from the external device, the comparison data including results of a comparison of artifact data or artifact statistics of the hearing device to artifact data or artifact statistics of other devices. Parameters of the hearing device are automatically adjusted based on the comparison data to improve performance of the feedback canceller.

Various aspects of the present subject matter include a hearing device including a microphone configured to sense acoustic signals, a feedback canceller configured to suppress acoustic feedback within the device, a memory, and one or more processors. The one or more processors are programmed to detect an artifact of the feedback canceller during operation of a hearing device, and store artifact data associated with the detected artifact in the memory, the artifact data including information about the detected artifact and information about the hearing device during occurrence of the detected artifact. The one or more processors are also programmed to compute artifact statistics based on at least some of the stored artifact data, and transmit one or more of the artifact data and the artifact statistics to an external device. The one or more processors are further programmed to receive comparison data from the external device, the comparison data including results of a comparison of artifact data or artifact statistics of the hearing device to artifact data or artifact statistics of other devices, and automatically adjust parameters of the hearing device based on the comparison data to improve performance of the feedback canceller.

This Summary is an overview of some of the teachings of the present application and not intended to be an exclusive or exhaustive treatment of the present subject matter. Further details about the present subject matter are found in the detailed description and appended claims.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Figure 1:
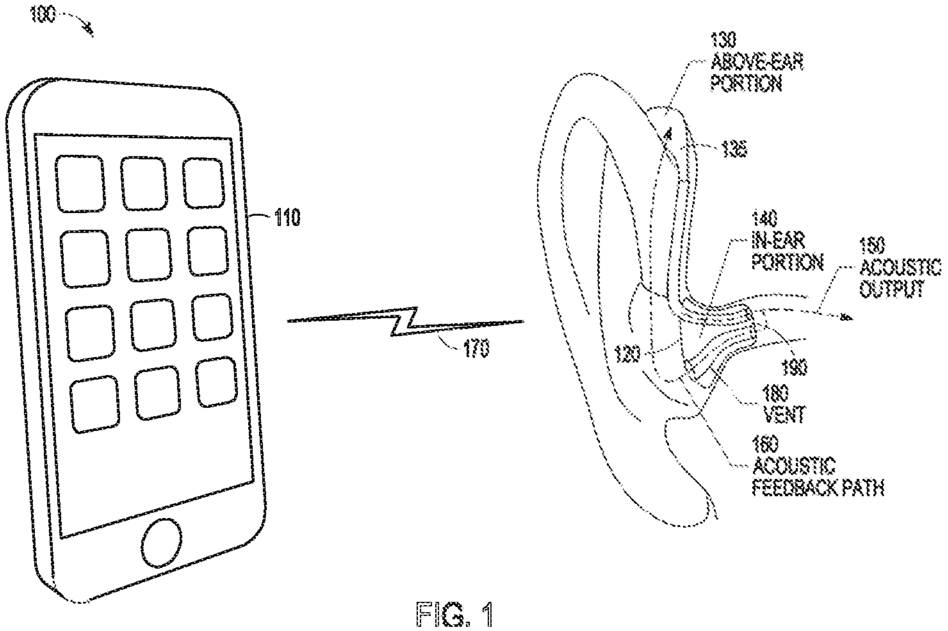
FIG. 1 illustrates a block diagram of a system for artifact detection and logging for tuning of a feedback canceller for hearing device applications, according to various embodiments of the present subject matter.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present detailed description will discuss hearing devices generally, including earbuds, headsets, headphones and hearing assistance devices using the example of hearing aids. Other hearing devices include, but are not limited to, those in this document. It is understood that their use in the description is intended to demonstrate the present subject matter, but not in a limited or exclusive or exhaustive sense.

Hearing aids may include a feedback canceller (FBC) used to suppress acoustic feedback within the device. The feedback canceller may experience artifacts, or periods of instability, such as chirping, howling, whistling, or entrainment during operation. These artifacts are the perceptual and technical consequence of a hearing aid providing more amplification than is possible to handle during normal operation, i.e., using a feedback cancellation algorithm. Typically these artifacts occur due a significant change of the acoustic feedback path while the adaptive feedback cancellation algorithm has not yet adapted to the new acoustic path. As another example, when the adaptive feedback cancellation algorithm is mal-adapting to strongly self-correlated incoming signals this results in entrainment.

Acoustic feedback occurs due to the acoustic coupling of the hearing aid receiver and the hearing microphone, creating a closed loop system. In order to reduce acoustic feedback, adaptive feedback cancellation can be used that estimates a digital copy of an acoustic feedback path using the receiver and microphone signals of the hearing aid and subsequently subtracts an estimate of the feedback component from the microphone signal. An important parameter in adaptive feedback cancellation is the step-size, or learning rate, of the adaptive filter used to estimate the acoustic feedback path. This learning rate provides a trade-off between fast convergence but larger estimation error for high learning rates and slow convergence but more accurate estimation for slower learning rates. The choice of the learning rate typically depends on the signal of interest, e.g., for signals that are highly correlated over time (tonal components in music or sustained alarm sounds) a slower adaptation rate is preferred, while for other signals faster adaptation rates may be used. Additionally, the acoustic feedback path is highly individualized making the choice of a universal learning rate setting suboptimal in many scenarios.

One approach to solving this problem is to provide consultation through a trained professional (such as an audiologist) with the goal of optimizing the feedback cancellation parameters for a user of the device. However, such a consultation is time consuming, and it may not always be possible to cover all relevant cases that can lead to artifacts.

The present subject matter solves the above problems by automatically inferring an optimal choice of parameters in the feedback cancellation algorithm during run-time by computing individual artifact risk statistics without requiring time consuming interventions and the fine tuning of the feedback cancellation algorithm of a professional.

The present subject matter provides improved devices, systems and methods of artifact detection and logging for tuning of a feedback canceller. In various embodiments, the present subject matter provides an algorithm for detecting and logging of artifacts of the FBC, i.e., brief periods of instability, of a hearing-aid or audio-device and associated additional information of the acoustic environment and user activities. Artifact data and statistics may be used to automatically identify and optimize suboptimal configurations of the individual feedback cancellation algorithm by comparison against a data from other users of the same or similar characteristics or device stored in database. In a variation, users may have control over which aspects of their data can be stored in such a database aimed at improving the feedback canceller's performance for individual users. Such an automated procedure of selecting feedback cancellation parameters can provide various benefits during the operation of the hearing aid (e.g., improved activity-dependent feedback cancellation, improved sound quality) as well as assist an audiologist in optimizing hearing aid settings (e.g., using individual artifact statistics to reduce risk of feedback for a hearing aid memory).

The present subject matter provides many benefits, including the ability to detect instabilities/artifacts during runtime, associate the detected instabilities with user activities and acoustic environment properties, and automatically provide adjusted activity- and environment-dependent feedback cancellation parameters, to provide improved artifact resilience and ease of use for the audiologist. In some embodiments, the present subject matter may detect artifacts using the methods described herein. Other methods of detecting artifacts may be used without departing from the scope of the present subject matter. In some embodiments, the present algorithm can be wholly or partially implemented within firmware of a hearing device.

FIG. 1 illustrates a block diagram of a system 100 for artifact detection and logging for tuning of a feedback canceller for hearing device applications, according to various embodiments of the present subject matter. The system 100 may include an external device 110, such as a personal computer or smartphone, and a hearing device 120. Other types of external devices may be used without departing from the scope of the present subject matter. The hearing device 120 may include an above-ear portion 130 and an in-ear portion 140 which may include a vent 180. In an example, the above-ear portion 130 may include an acoustic input transducer (e.g., microphone 135) for converting received acoustic audio into digital or analog audio signals. The present subject matter can be used in any hearing device, including in-the-ear type devices, without departing from the scope of the present subject matter.

In various embodiments, hearing device 120 is configured to produce a receiver signal (such as a sound signal) through a receiver 190 of the hearing device 120, or a physical extension of the receiver (such as a sound tube of a behind-the-ear device) placed inside an ear canal of a user. The system 100 further includes a microphone 135 and one or more processors programmed to perform methods and algorithms discussed herein. In various embodiments, the one or more processors may be in the hearing device 120, in the external device 110, or a combination of both the hearing device 120 and the external device 110.

The hearing device 120 may communicate wirelessly 170 with the external device 110, or using a wired connection, to transmit data or audio for set up and programming the hearing device 120, in some embodiments. In some embodiments a wireless, non-acoustic audio stream may be transmitted from a wireless audio source to the hearing assistance device 120, which may be amplified and provided to a user as an acoustic output 150. A portion of the acoustic output 150 may be fed back to the microphone on the above-ear portion 130, such as via the example acoustic feedback path 160.

Figure 2:
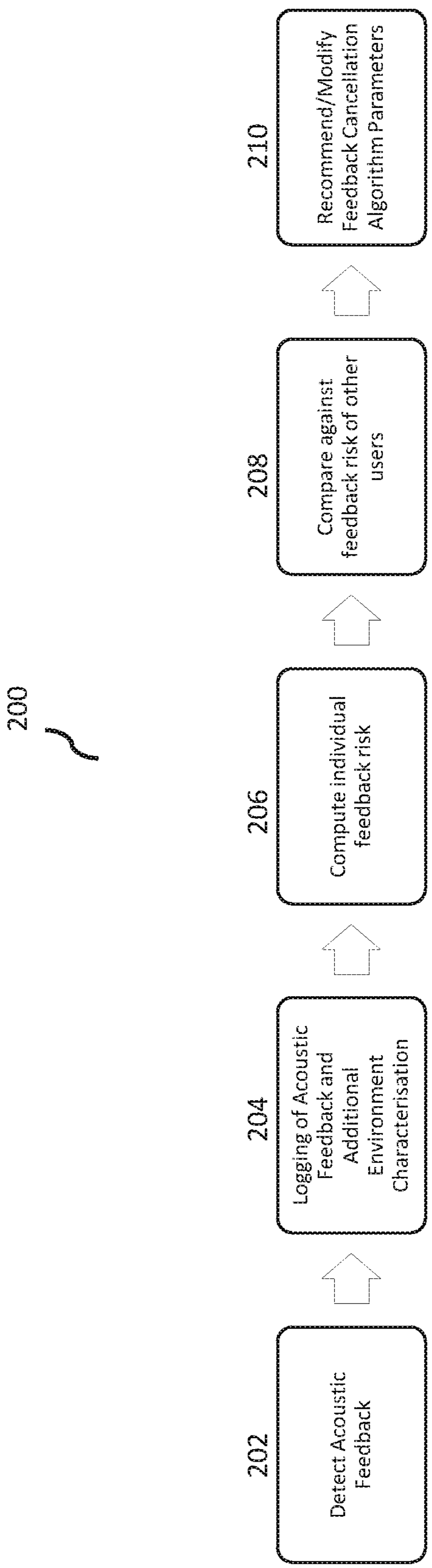
FIG. 2 illustrates a flow diagram of a method for artifact detection and logging for tuning of a feedback canceller, according to various embodiments of the present subject matter.

FIG. 2 illustrates a flow diagram of a method for artifact detection and logging for tuning of a feedback canceller, according to various embodiments of the present subject matter. The method 200 includes detecting acoustic feedback, at step 202, including detecting the presence of artifacts, such as instabilities or entrainment, in the microphone signal using signals or features computed from these signals available in the hearing aid during run-time operation of the hearing aid. Signals available in the hearing aid used to detect artifacts include, but are not limited to, a microphone signal, a receiver signal, or hearing aid gain. The method 200 further includes logging of acoustic feedback and additional environment characterization, at step

204. For example, the present method may store the detection results in the hearing aid and store associated relevant information about the state of the hearing aid during the occurrence of artifact, including such information as applied gain, acoustic scene/environment classification result, and/or user activity. Other associated information may be sensed and recorded without departing from the scope of the present subject matter.

At step 206, the method 200 includes computing an individual feedback risk, such as an artifact statistic for the device of the user. For example, the method may use the stored information to compute a statistical representation of the stored information, such as a mean and a variance. Other artifact statistics may be computed without departing from the scope of the present subject matter. In some embodiments, the method may transmit stored data and/or its statistical representation (artifact statistics) through a wireless link to an external device, such as the user's smartphone. At step 208, the method includes comparing the stored data, such as artifact data or artifact statistics, against the stored data of other users of the same or similar devices. For example, the method may use the statistical representation in combination with previously collected user data to compare the individual artifacts against artifacts for other users stored in a database. The comparison may be performed by processors in the device, in an external device, or a combination thereof. The method 200 also includes, at step 210, automatically modifying feedback cancellation parameters or other parameters of the hearing device based on the comparison. In one example, the method uses the result of the comparison to automatically adjust parameters of the hearing aid to optimize parameters of the feedback cancellation algorithm. In another example, the method uses the result of the comparison to make a recommendation to the user or to a professional to adjust the parameters. In various embodiments, the present subject matter provides a link to fitting software to make the recommendation on a graphical user interface (GUI) accessible to the professional.

In various embodiments, the storing of data and computing of statistics are performed on a programmable schedule. In some embodiments, the storing and computing are performed periodically. In various embodiments, the method 200 may be entirely automated, and may be implemented completely in firmware of the hearing device. In some embodiments, the method 200 may be implemented in part in firmware on the device (for example, for detection of artifacts and logging of data), and in part on a remote device such as the user's smartphone (for example, for computation of individual artifact statistics and comparison to artifact data and statistics of other users). Other divisions of processing may be used without departing from the scope of the present subject matter. In some embodiments, the method includes a connection to a database with data from other users, such as cloud storage. Data may be stored in other accessible locations without departing from the scope of the present subject matter.

According to various embodiments, the statistical representation or artifact statistic is updated based on data collected on the hearing aid as well as data for the same or similar hearing aid available in a memory, such as a database or cloud storage. The results of the comparison may used to recommend an adjustment of the parameters in the feedback cancellation algorithm, in an embodiment. In various embodiments, the individual artifact risk or artifact statistic is used to modify the step-size and/or the sensitivity of a step-size modification mechanism (variable step-size) of the adaptive feedback canceller in acoustic scenarios with increased risk of artifacts, such as if the user is running, exercising, on a phone call, or other acoustic scenario with increased artifact risk. In some embodiments, the individual artifact risk or artifact statistic is used to modify the sensitivity of an artifact detection mechanism in acoustic scenarios or environments/scenes or activities with increased risk of artifacts.

The present subject matter may be used in situations where a hearing aid or other in-the-ear device is placed in a user's ear, and operating to suppress acoustic feedback within the device. Specifically, the present subject matter may be used during normal run-time operation of the device to detect and log the occurrence of artifacts and information available in the hearing aid during occurrence of the artifact (such as classification of the acoustic environment, memory setting, etc.) which are used to build up an individual statistic of artifact risk. In various embodiments, the individual artifact statistic is compared periodically or on user's or professional's (such as an audiologist) request against data of other users and used to improve the settings of the individual feedback cancellation of the device. In some embodiments, data of other users of similar devices is available in a storage location accessible to one or more processors, such as cloud storage. The present subject matter may include a recommendation system to alert the user to change hearing settings through an app on the user's smartphone, in some embodiments. In various embodiments, the present subject matter may include a recommendation system to alert the professional to change the settings of the feedback canceller of the hearing aid.

Figure 3:
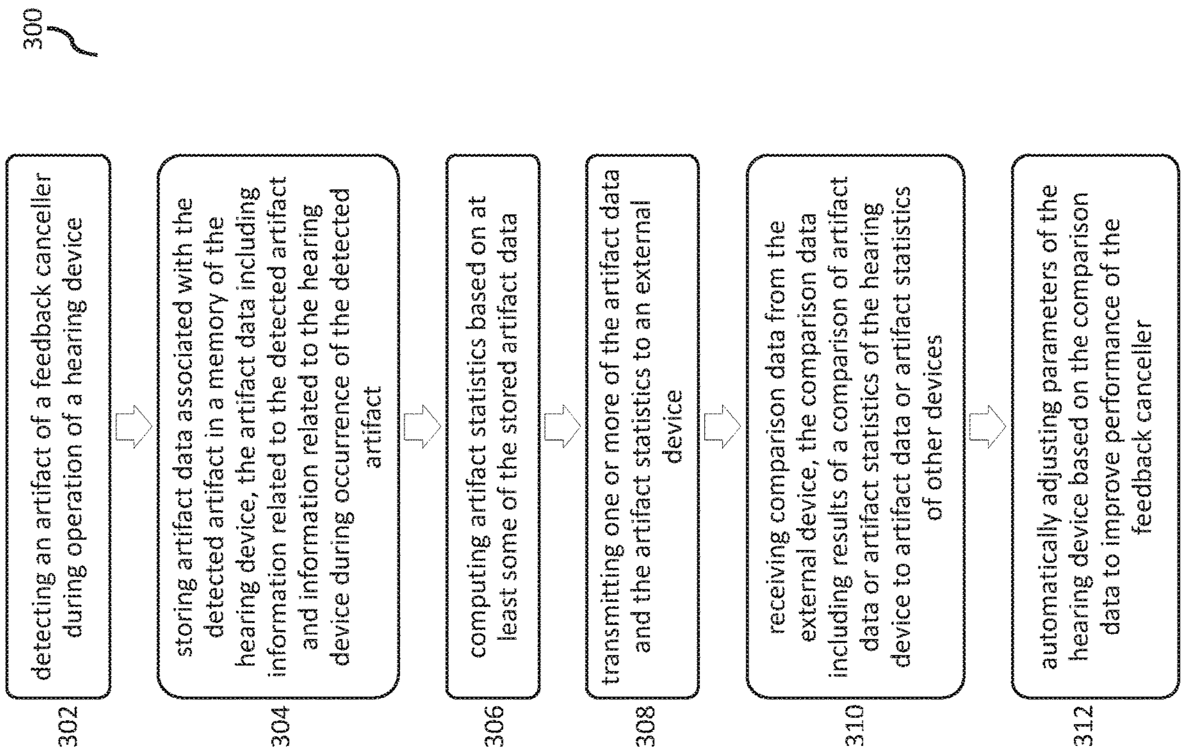
FIG. 3 illustrates a flow diagram of a method for artifact detection and logging for tuning of a feedback canceller for hearing device applications, according to various embodiments of the present subject matter.

FIG. 3 illustrates a flow diagram of a method for artifact detection and logging for tuning of a feedback canceller for hearing device applications, according to various embodiments of the present subject matter. The method 300 includes detecting an artifact of a feedback canceller during operation of a hearing device, at step 302. At step 304, artifact data associated with the detected artifact is stored in a memory of the hearing device, the artifact data including information related to the detected artifact and information related to the hearing device during occurrence of the detected artifact. At step 306, artifact statistics are computed based on at least some of the stored artifact data, and one or more of the artifact data and the artifact statistics are transmitted to an external device, at step 308. At step 310, comparison data is received from the external device, the comparison data including results of a comparison of artifact data or artifact statistics of the hearing device to artifact data or artifact statistics of other devices. Parameters of the hearing device are automatically adjusted based on the comparison data to improve performance of the feedback canceller, at step 312.

According to various embodiments, detecting artifacts of the feedback canceller includes using a signal received by a microphone of the hearing device, a signal produced by a receiver of the hearing device, and/or a gain of the hearing device. Any other method of detecting artifacts (such as chirps, feedback, or howling) may be used without departing from the scope of the present subject matter. In one example, occurrences of howling or chirping may be detected by setting a feedback limit, i.e., the maximum stable gain of the hearing device. In another example, chirps or oscillation may be detected by using an exponential growth detector on the envelope of the input signal of the hearing device. In yet another example, chirps or feedback may be detected based on a level difference of two microphones of the hearing device, such as between an in the ear microphone and a behind the ear microphone.

In various embodiments, storing the artifact data includes storing information related to an applied gain, an acoustic environment classification result, and/or a user activity during occurrence of the detected artifact. Other types of data or combinations of types of data may be stored, including but not limited to demographic data of the user, hearing loss of the user, global positioning system (GPS) location data of the user, and/or time stamps. The method further includes updating the artifact statistics based on the received comparison data, in some embodiments.

In some examples, the method includes adjusting a parameter of the feedback cancellation algorithm. In one example, individual artifact statistics of a user are compared with a population of hearing device users of similar demographics, hearing loss, device gain settings and/or feedback canceller. If the individual artifact statistics are significantly different (based on a programmable threshold, for example) from the population artifact statistics, the present subject matter may automatically change (or recommend a change to) parameters or settings of the feedback canceller of the user to reduce or minimize risk of further artifacts, based on the population artifact statistics. In various embodiments, the change or recommendation for change of a parameter of the feedback canceller is selected to yield the least artifact risk from available feedback canceller configurations, as determined from the population artifact statistics. Other types of comparisons and parameter changes can be used without departing from the scope of the present subject matter. In some examples, the method also includes recommending an adjustment of a parameter of a feedback cancellation algorithm of the feedback canceller based on the comparison data. The recommendation may be instead of or in addition to the automatic adjustment, in various embodiments.

According to various examples, computing the artifact statistics includes computing a mean or variance of the stored artifact data, and/or computing a device artifact risk. Other types of artifact statistics can be computed and used for the comparison without departing from the scope of the present subject matter. In various embodiments, any type of machine learning and/or deep neural network may be used for the computation, comparison and adjustment. In some embodiments, the method further includes using the artifact statistics to modify a step size of the feedback canceller based on an acoustic environment classification result or user activity. The method also includes using the artifact statistics to modify a sensitivity of step size modification of the feedback canceller based on an acoustic environment classification result or user activity, in some embodiments. According to various embodiments, the method further includes using the artifact statistics to modify a sensitivity of artifact detection based on an acoustic environment classification result or user activity.

Various embodiments include a hearing device including a microphone configured to sense acoustic signals, a feedback canceller configured to suppress acoustic feedback within the device, a memory, and one or more processors. The one or more processors are programmed to detect an artifact of the feedback canceller during operation of a hearing device, and store artifact data associated with the detected artifact in the memory, the artifact data including information about the detected artifact and information about the hearing device during occurrence of the detected artifact. The one or more processors are also programmed to compute artifact statistics based on at least some of the stored artifact data, and transmit one or more of the artifact data and the artifact statistics to an external device. The one or more processors are further programmed to receive comparison data from the external device, the comparison data including results of a comparison of artifact data or artifact statistics of the hearing device to artifact data or artifact statistics of other devices, and automatically adjust parameters of the hearing device based on the comparison data to improve performance of the feedback canceller.

According to various embodiments, the artifact data includes information related to an applied gain, an acoustic environment classification result, or a user activity during occurrence of the detected artifact. The device also includes a wireless transceiver configured to communicate with the external device, in various embodiments. The wireless transceiver may include a Bluetooth® or Bluetooth® Low Energy (BLE) transceiver. Other types of wireless transceivers (or transmitters and receivers) may be used without departing from the scope of the present subject matter. In various embodiments, artifact data or artifact statistics of the hearing device and artifact data or artifact statistics of other devices are logged in an external storage location. The external storage location may include cloud storage, but other types of storage locations may be used without departing from the scope of the present subject matter. In various embodiments, the external device includes a smart phone or other computing device. The hearing device includes a hearing aid or other ear worn device, in various embodiments. The user's data and statistics are stored both on the hearing device and in a remote storage location, in various embodiments.

In binaural environments, the hearing device is configured to communicate with a second hearing device (such as in the opposite ear of the user) to coordinate adjustments and recommendations between left and right devices. In some embodiments, each device detects artifacts separately. In some embodiments, one device acts as a master device to control adjustments and recommendations for the other device. In some examples, the device communicates with a separate body worn device to provide processing of the methods of the present subject matter, with or without communicating with the external device.

The present subject matter provides for detecting and logging the occurrence of acoustic feedback artifacts and comparing the detected data and computed statistics to stored data for one or multiple users, making it possible to assess the individual risk of artifacts and recommend adjustments in an automated or semi-automated fashion based on both the logged data of individual users and a database including other users' logged data. The present subject matter is superior to previous solutions that aimed at mitigating feedback immediately without logging additional data on the occurrence of feedback or limiting the hearing aid gain on an individual basis. For example, when a user experiences a relatively new acoustic environment, the present subject matter may update parameters of the feedback canceller based on the data of other users who experienced such environment and/or were in a similar location, and/or fall in the same demographic category of the user. Previous solutions relied on fixed and previously tuned parameters for such a new acoustic environment for the user.

In addition, the present subject matter may update the parameters and sensitivity of artifact detection methods based on the artifact risk in various device states and acoustic environments based on individual and population data. Previous solutions relied on fixed and previously tuned detection methods without being adjusted to the individual device usage or compared to similar devices of other users. The present subject matter is superior to previous solutions because it allows use of individual and population/group data to assess the long-term risk of feedback and provides automated adjustments and/or recommendations based on comparison against similar users to reduce the individual risk of feedback artifacts. Previous solutions require the professional to understand the complaint of the user or limit the gain of the hearing aid which can limit the effectiveness of the hearing aid to compensate a hearing loss.

According to various embodiments, adjusting or making a recommendation to adjust a parameter of the hearing device includes adjusting or making a recommendation for a modification of an operational characteristic of the hearing device. In some embodiments, adjusting or making a recommendation for a modification of a parameter of the hearing device includes making a recommendation to increase or decrease gain of the hearing device. In other embodiments, adjusting or making a recommendation for a modification of a parameter of the hearing device includes adjusting or making a recommendation to modify a step-size of the feedback canceller. Other parameters and/or operational characteristics of the hearing device may be adjusted (or recommended to be adjusted) without departing from the scope of the present subject matter.

Figure 4:
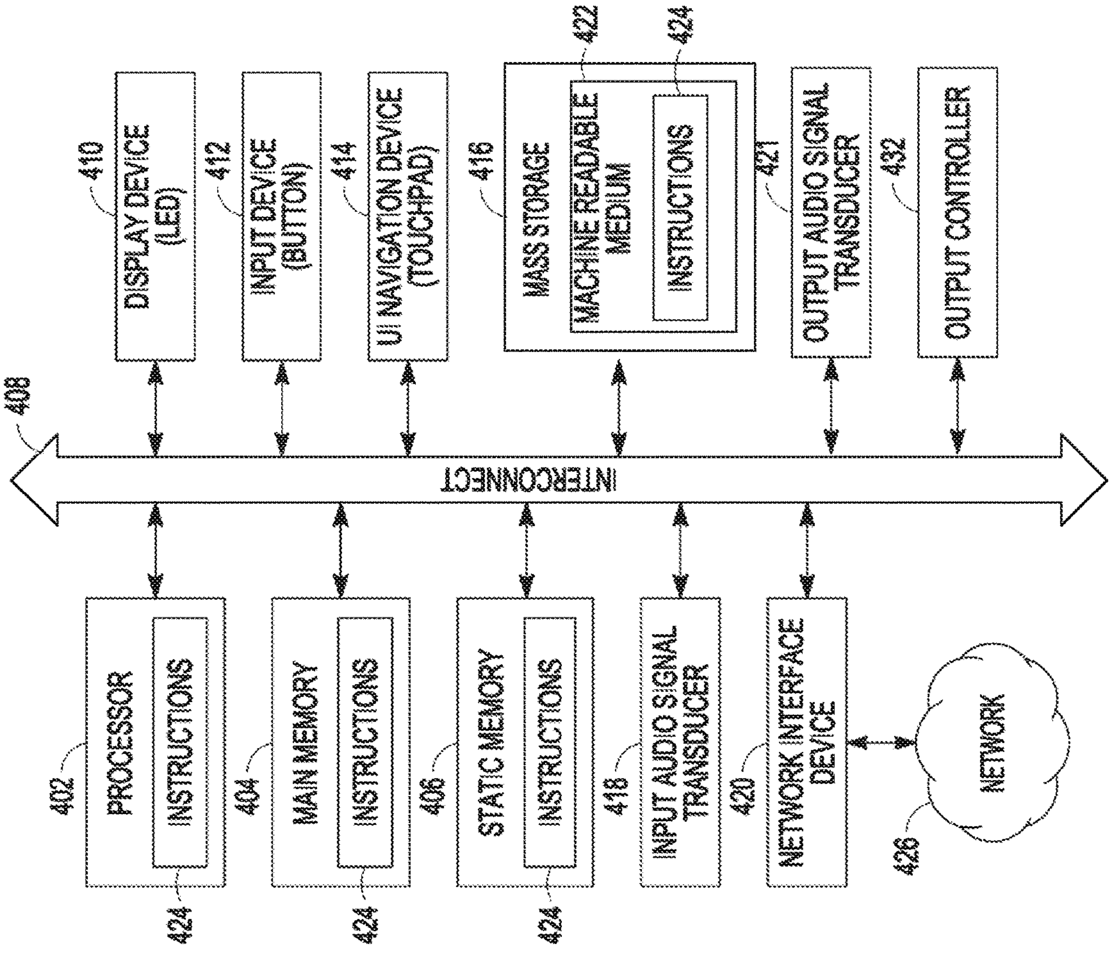
FIG. 4 illustrates a block diagram of an example machine upon which any one or more of the techniques discussed herein may perform.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, one or more input audio signal transducers 418 (e.g., microphone), a network interface device 420, and one or more output audio signal transducer 421 (e.g., speaker). The machine 400 may include an output controller 432, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400, and includes digital or analog communications signals or outer imangible medium to facilitate communication of such software.

Various embodiments of the present subject matter support wireless communications with a hearing device. In various embodiments the wireless communications may include standard or nonstandard communications. Some examples of standard wireless communications include link protocols including, but not limited to, Bluetooth™, Bluetooth™ Low Energy (BLE), IEEE 802.11 (wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications while others support NFMI. Although the present system is demonstrated as a radio system, it is possible that other forms of wireless communications may be used such as ultrasonic, optical, infrared, and others. It is understood that the standards which may be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, SPI, PCM, ATM, Fibre-channel, Firewire or 1394, InfiniBand, or a native streaming interface. In various embodiments, such connections include all past and present link protocols. It is also contemplated that future versions of these protocols and new future standards may be employed without departing from the scope of the present subject matter.

Hearing assistance devices typically include at least one enclosure or housing, a microphone, hearing assistance device electronics including processing electronics, and a speaker or "receiver." Hearing assistance devices may include a power source, such as a battery. In various embodiments, the battery is rechargeable. In various embodiments multiple energy sources are employed. It is understood that in various embodiments the microphone is optional. It is understood that in various embodiments the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing assistance devices include a processor. In digital hearing assistance devices with a processor, programmable gains may be employed to adjust the hearing assistance device output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application may be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various embodiments of the present subject matter the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments of the present subject matter, different realizations of the block diagrams, circuits, and processes set forth herein may be created by one of skill in the art without departing from the scope of the present subject matter.

It is further understood that different hearing devices may embody the present subject matter without departing from the scope of the present disclosure. The devices depicted in the figures are intended to demonstrate the subject matter, but not necessarily in a limited, exhaustive, or exclusive sense. It is also understood that the present subject matter may be used with a device designed for use in the right ear or the left ear or both ears of the wearer.

The present subject matter is demonstrated for hearing devices, including hearing assistance devices, including but not limited to, behind-the-ear (BTE), in-the-ear (ITE), in-the-canal (ITC), receiver-in-canal (RIC), invisible-in-canal (IIC) or completely-in-the-canal (CIC) type hearing assistance devices. It is understood that behind-the-ear type hearing assistance devices may include devices that reside substantially behind the ear or over the ear. Such devices may include hearing assistance devices with receivers associated with the electronics portion of the behind-the-ear device, or hearing assistance devices of the type having receivers in the ear canal of the user, including but not limited to receiver-in-canal (RIC) or receiver-in-the-ear (RITE) designs. The present subject matter may also be used in hearing assistance devices generally, such as cochlear implant type hearing devices. The present subject matter may also be used in deep insertion devices having a transducer, such as a receiver or microphone. The present subject matter may be used in bone conduction hearing devices, in some embodiments. The present subject matter may be used in devices whether such devices are standard or custom fit and whether they provide an open or an occlusive design. It is understood that other hearing devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A method, comprising:

detecting an artifact of a feedback canceller during operation of a hearing device;

storing artifact data associated with the detected artifact in a memory of the hearing device, the artifact data including information related to the detected artifact and information related to the hearing device during occurrence of the detected artifact;

computing artifact statistics based on at least some of the stored artifact data;

transmitting one or more of the artifact data and the artifact statistics to an external device;

receiving comparison data from the external device, the comparison data including results of a comparison of the artifact data or the artifact statistics of the hearing device to artifact data or artifact statistics of other devices; and automatically adjusting parameters of the hearing device based on the comparison data to improve performance of the feedback canceller.

2. The method of claim 1, wherein detecting artifacts of the feedback canceller includes using a signal received by a microphone of the hearing device.

3. The method of claim 1, wherein detecting artifacts of the feedback canceller includes using a signal produced by a receiver of the hearing device.

4. The method of claim 1, wherein detecting artifacts of the feedback canceller includes using a gain of the hearing device.

5. The method of claim 1, wherein storing the artifact data includes storing information related to an applied gain, an acoustic environment classification result, or a user activity during occurrence of the detected artifact.

6. The method of claim 1, further comprising updating the artifact statistics based on the received comparison data.

7. The method of claim 1, further comprising recommending an adjustment of a parameter of a feedback cancellation algorithm of the feedback canceller based on the comparison data.

8. The method of claim 1, wherein computing the artifact statistics includes computing a mean or variance of the stored artifact data.

9. The method of claim 1, wherein computing the artifact statistics includes computing a device artifact risk.

10. The method of claim 1, further comprising using the artifact statistics to modify a step size of the feedback canceller based on an acoustic environment classification result or user activity.

11. The method of claim 1, further comprising using the artifact statistics to modify a sensitivity of step size modification of the feedback canceller based on an acoustic environment classification result or user activity.

12. The method of claim 1, further comprising using the artifact statistics to modify a sensitivity of artifact detection based on an acoustic environment classification result or user activity.

13. A hearing device, comprising:

a microphone configured to sense acoustic signals;

a feedback canceller configured to suppress acoustic feedback within the device;

a memory; and one or more processors programmed to:

detect an artifact of the feedback canceller during operation of the hearing device;

store artifact data associated with the detected artifact in the memory, the artifact data including information about the detected artifact and information about the hearing device during occurrence of the detected artifact;

compute artifact statistics based on at least some of the stored artifact data;

transmit one or more of the artifact data and the artifact statistics to an external device;

receive comparison data from the external device, the comparison data including results of a comparison of the artifact data or the artifact statistics of the hearing device to artifact data or artifact statistics of other devices; and automatically adjust parameters of the hearing device based on the comparison data to improve performance of the feedback canceller.

14. The hearing device of claim 13, wherein the artifact data includes information related to an applied gain, an acoustic environment classification result, or a user activity during occurrence of the detected artifact.

15. The hearing device of claim 13, further comprising a wireless transceiver configured to communicate with the external device.

16. The hearing device of claim 15, wherein the wireless transceiver includes a Bluetooth® or Bluetooth® Low Energy (BLE) transceiver.

17. The hearing device of claim 13, wherein the artifact data or the artifact statistics of the hearing device and artifact data or artifact statistics of other devices are logged in an external storage location.

18. The hearing device of claim 17, wherein the external storage location includes cloud storage.

19. The hearing device of claim 13, wherein the external device includes a smart phone.

20. The hearing device of claim 13, wherein the hearing device includes a hearing aid.

* * * * *